No. 728,385. Patented May 19, 1903.

UNITED STATES PATENT OFFICE.

DITTMAR FINKLER, OF BONN, GERMANY.

PROCESS OF MAKING ALBUMOSE.

SPECIFICATION forming part of Letters Patent No. 728,385, dated May 19, 1903.

Application filed November 4, 1902. Serial No. 130,113. (No specimens.)

*To all whom it may concern:*

Be it known that I, DITTMAR FINKLER, residing at Bonn-on-the-Rhine, Germany, have invented certain new and useful Improvements in the Process of Making Albumose; and I do hereby declare the following to be a full, clear, and exact description of the invention, such as will enable others skilled in the art to which it appertains to make and use the same.

This invention relates to improvements in the extraction of albumen from substances containing the same.

In effecting the extraction of pure albumen from muscular fibers the greatest difficulty has heretofore been caused by the composition of the fibers, which are not homogeneous chemical masses. A muscular fiber is composed of a number of fibrillæ which lie side by side in the direction of their length, so that each fiber can be itself resolved into a large number of longitudinal fibrillæ. All these fibrillæ are inclosed in gelatin or a collogenic substance. Fat exists in exceedingly fine drops between the muscle fibers in the spaces in this collogenic tissue and penetrates with the latter between the numerous fine fibrillæ of the muscles. Another form of fat, moreover, exists more deeply in the substance of the muscle fibers, and these fatty mixtures are exceedingly difficult to remove from the fibers, as to do so it is necessary that the material to be used as a solvent shall penetrate the whole of the gelatin material, the collogenic tissue, and, finally, through the albuminous constituents of the fine fibrillæ. In order, however, to extract pure albumen, the aforesaid collogenic tissue, inclusive of the gelatin, and especially the two above-named kinds of fat molecules, must be removed, for the collogenic tissue and the gelatin aid putrefaction and give rise to objectionable flavor. Furthermore, the fat in the state of fine division in which it exists in the muscle is very liable to become decomposed and rancid, so that even the smallest traces of fat gradually impart an unpleasant flavor to the albumen. Again, fat is always the carrier of coloring-matters and tasting and odorous substances, as is seen, for example, in the case of butter and fat in which the smell of such substances is always retained.

The object I have had in view, therefore, is chiefly the removal of the gelatin, collogenic tissue, and fat. To effect this—namely, the extraction of pure muscle albumen—it has been found to be very advantageous to soak the albumen of the muscle in acid, and hydrochloric, nitric, sulfuric, and organic acids in certain degrees of dilution are particularly suitable for the purpose, especially at higher temperatures rising to boiling-point, by which soaking the albumen swells. In carrying out this operation, however, it is necessary to take in consideration the fact (which has escaped the notice of former experimenters in this branch of work) that the inorganic or organic acids used in the soaking or swelling operation must not be subsequently removed by neutralization, as this causes precipitation of the substances dissolved in the acid. The acid must, on the contrary, be gradually washed out, and even this operation must be effected in a particular manner, as it is found that it is not possible to wash away the fat with the acid from tissue by means of cold water. To effect this, higher temperatures, stretching to the boiling-point, must be employed, for when fat and fatty acids are dissolved in dilute inorganic or organic acids they are again precipitated for the most part as solid substances when the solution is cooled, thus giving a similar result to that obtained when the acids are neutralized.

The process forming the subject of this invention consists, therefore, in pouring over the muscle mass dilute acid (hydrochloric, nitric, sulfuric, or an organic acid) at a temperature which may rise to the boiling-point or above and in then washing out the acid with water or a neutral liquid at a proper temperature after the said acid has penetrated to the albuminous substance of the muscle fibers—that is to say, after it has dissolved the gelatin, transformed the collogenic tissue, and partially split up and partially dissolved the fat. By this washing operation the gelatin and the fat in the acid are dissolved at the proper temperature and washed away with the same.

The above-described method is of particular value in the case of flesh meal—that is to say, dried flesh fibers—although in principle it is also applicable to fresh flesh, from which it is perhaps more easy to extract the gelatin and fat, since the dried muscle fibers, on account of the changes which take place in the albumen on drying, offer considerable opposition to the penetration of the solvent. The process is also applicable in essentially the same manner to other albumen-containing materials than muscle fiber, since fat particles and other impurities can be attacked in plant-cells in the same way as in the case of coagulated or enveloping albuminous particles. The present process can also be applied to albuminous materials which have been subjected to a preliminary treatment with alkali. Under certain circumstances it is advantageous to dissolve the albumen from the substance containing it by means of alkaline solutions and then to precipitate the dissolved albumen from the solution by a suitable addition of acid. This precipitate then forms the raw albuminous material, which is treated in the manner above described. It may also be advantageous in certain cases to first wash the albuminous materials in an alkaline lye to separate out from the albumen such substances as are soluble in the lye. This washing takes place under conditions which in general do not admit of the solution of the albumen. The albumen-containing materials after being washed in the alkali are further treated by the above-described process.

My processes may be further explained by means of the following illustration, which, however, it is to be understood, is only given by way of example.

Example: The albumen-containing material—for example, flesh meal—is treated with a two-per-cent. (or stronger) solution of acid—for example, hydrochloric acid—the temperature being preferably raised to the boiling-point, although it can remain below the boiling-point, particularly when the acid is of greater strength than that above mentioned. Furthermore, the ordinary boiling temperature can be exceeded when comparatively weak acid is employed at a high pressure in closed vessels. The concentration, temperature, and duration of the operation are dependent upon the resistance of the albuminous material and are so arranged that the said material is not destroyed. In this operation the albuminous material runs out and is then washed out with hot water until all soluble matters and the acid are removed. This is preferably effected by pouring off the acidulated water first obtained and treating the remaining albuminous material with fresh hot water, which is then poured away, treatment with fresh hot water being again resorted to until nothing further is dissolved—that is to say, until the washing-water no longer shows an acid reaction. The neutralization of the acid in the presence of the albuminous material has not taken place. The albuminous mass, which has been well washed, as above described, with hot water, is then separated from the water—say by decantation—and is dried in a centrifugal apparatus or in drying-chambers.

If it be desired to obtain the albuminous substance in a finely-divided condition in the acid liquid for the purpose of attaining a higher degree of purity, a solution can first be obtained with alkali, the acid being then added in the necessary excess and the albuminous material which is precipitated being then treated with acid under the action of heat, as above described.

Having now described my invention, what I desire to secure by a Patent of the United States is—

1. The process of extracting albumen from substances containing the same, which consists in treating said substances with a suitable dilute acid to dissolve the collogenic tissue, fat and other impurities, and finally eliminating the acid and impurities, leaving albumen undissolved, substantially as described.

2. The process of extracting albumen from substances containing the same, which consists in treating said substances with a suitable hot, dilute acid, to dissolve the collogenic tissue, fat and other impurities, separating the liquid from the undissolved albumen and freeing the albumen from acid solution with hot water, substantially as described.

3. The process of extracting albumen from substances containing the same, which consists in first treating them with a solution of an alkali, then acidulating the resulting solution with a suitable acid to dissolve the impurities, heating the same and finally washing out the impurities with hot water, substantially as described.

In testimony that I claim the foregoing as my invention I have signed my name in presence of two subscribing witnesses.

DITTMAR FINKLER.

Witnesses:
CARL SCHMITT,
GUSTAV SIMBOLD.